May 9, 1933.  W. HONSBERG  1,907,812
ELECTROLYTIC CELL
Filed Feb. 3, 1930

INVENTOR
Werner Honsberg
BY
ATTORNEYS

Patented May 9, 1933

1,907,812

UNITED STATES PATENT OFFICE

WERNER HONSBERG, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

ELECTROLYTIC CELL

Application filed February 3, 1930, Serial No. 425,627, and in Germany February 5, 1929.

The present invention relates to an improvement of electrolytic cells comprising diaphragms.

The durability of the diaphragm is essential for the usefulness of an electrolytic cell. The durability is in particular diminished, as is known from cells with small distance of the electrodes having a high output, by the diaphragm arranged between the electrodes undergoing in practice displacements the magnitude and direction of which continuously change. The said displacements are due to the unavoidable change in pressure within the electrolyte on both sides of the diaphragm. Diaphragms of large surfaces are not displaced in the same direction at the same time, but single parts thereof often differently change their positions relative of the electrodes. The said displacements are limited by fixed bodies next to them, mostly the electrodes themselves which in the case of cells with high output leave only a small distance between each other and accordingly also between themselves and the diaphragm. A specific kind of the said displacements consists in a continuous progression by stages of the diaphragm from one electrode and return to the initial position. By the continuous striking of the diaphragm against the electrode the diaphragm is rubbed through and rendered useless.

I have now found that the durability of the diaphragm in electrolytic cells is essentially increased by fixing the diaphragm between the electrodes by means of elastic or resilient elements so that moving of the diaphragm leading to its destruction is avoided.

The said elastic or resilient elements may consist of rubber or other insulating material or metal and the like and may have the form of ribbons, strong wires, or thin-walled tubes. In the case of metallic diaphragm they must consist of stable insulating material, such as for example soft or hard rubber. When the diaphragm consists of a material which is not or is a poor electric conductor, the elastic elements may be made of metal and are preferably connected to the electrodes in a conducting manner or made in one piece with the electrodes, so that they act themselves as electrodes. In some cases it may also be advantageous to arrange the electrodes in a resilient manner or to design the electrodes themselves to form resilient elements and fix the diaphragm by means of the electrodes so that further fixing elements may be dispersed with. Often it will be sufficient to arrange only one electrode in a resilient manner or to fix the diaphragm by means of only one electrode which itself is resilient.

Figure 1:
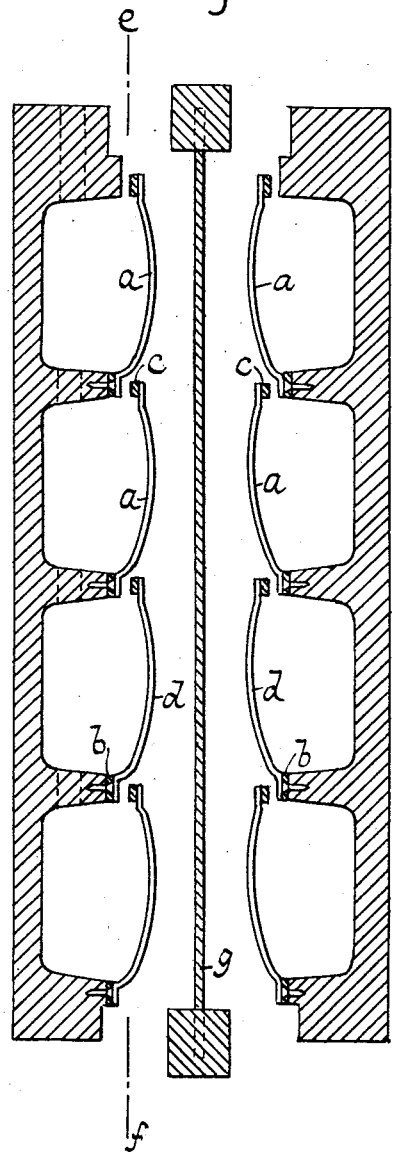
Figure 2:
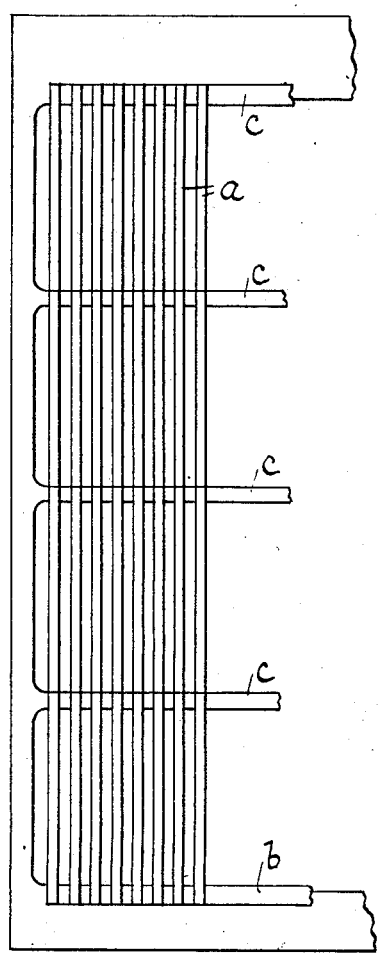

The invention will be more fully explained with reference to the accompanying drawing which shows in Figure 1 an electrolytic cell in vertical cross-section, Figure 2 being a perspective view of one electrode.

The electrodes consist of a great number of resilient rods or wires $a$ arranged in parallel and with small interstices between each other, the said rods or wires being bent to form segments the outer part thereof turned to the counterelectrode. The ends $b$ of the said rods or wires on one side are connected by riveting or welding to a metallic conductor by which the current is supplied. The other free ends $c$ of the said rods or wires may be connected to each other and are preferably arranged to move freely on a support. The electrode is covered with the diaphragm and the counterelectrode pressed against the diaphragm and said electrode that the outer parts $d$ of the said segments are about or quite in a single plane ($e-f$) whereby the diaphragm $g$ is fixed at so many points that it does not move on change of pressure in the liquid or gas phase.

The said method of protecting the diaphragm against wear is independent of the kind of electrolytic cell and is particularly useful with cells of the filter press type since with these a reliable tightening of the single frames is necessary besides a safe fixing of the diaphragm.

What I claim is:—

1. An electrolytic cell having a positive and a negative electrode, a diaphragm between said electrodes, the said diaphragm being fixed in its position between the electrodes by at least one of the electrodes being provided with springy elements over substantially the whole electrode area.

2. An electrolytic cell having a positive and a negative electrode, a diaphragm between said electrodes, said diaphragm being maintained in position by a plurality of springs secured to an electrode.

3. A device as described in claim 2 wherein said springs are secured at only one of their ends to an electrode.

4. An electrolytic cell having a positive and a negative electrode, a diaphragm between said electrodes, said diaphragm being maintained in position by a plurality of bowed spring strips secured at only one of their ends to an electrode in electrical conducting relation therewith.

5. An electrolytic cell having a positive and a negative electrode, a diaphragm between said electrodes, a plurality of bowed spring strips secured at only one of their ends to both electrodes and forming a conducting part thereof, the bowed portion of said springs bearing against said diaphragm to retain the same in position.

6. An electrolytic cell having a positive and a negative electrode, a diaphragm between said electrodes, each of said electrodes comprising a frame having a plurality of cross-pieces intermediate the upper and lower bars of the frame, a plurality of bowed spring strips secured at only one of their ends to said cross-pieces and top and bottom frame bars to thus cover substantially the entire face of said frame, said strips bearing with their bowed portions against said diaphragm to retain the same in position.

7. An electrolytic cell having a positive and a negative electrode, a diaphragm between said electrodes, a plurality of spring strips secured at one of their ends to said electrodes and bearing against said diaphragm to maintain the same in position, said strips being arranged in a plurality of horizontal rows.

8. A device as described in claim 7 wherein the free ends of the strips in each row are secured together.

In testimony whereof I have hereunto set my hand.

WERNER HONSBERG.